United States Patent
Vialen et al.

(10) Patent No.: US 6,542,516 B1
(45) Date of Patent: Apr. 1, 2003

(54) ADAPTATION LAYER FOR REALIZING PROTOCOL ADAPTATIONS IN A DIGITAL WIRELESS DATA TRANSMISSION SYSTEM

(75) Inventors: Jukka Vialen, Espoo (FI); Esko Oikarinen, Oulu (FI); Janne Pietarila, Kiviniemi (FI); Mikko Korpela, Raahe (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/291,465

(22) Filed: Apr. 14, 1999

(30) Foreign Application Priority Data

Apr. 15, 1998 (FI) .................................................. 980837

(51) Int. Cl.⁷ .......................... H04B 7/216; H04J 3/16; H04J 3/22; H04M 1/00
(52) U.S. Cl. ........................ 370/465; 370/335; 370/466; 370/469; 455/552; 455/557
(58) Field of Search ................................ 370/465, 466, 370/467, 469, 329, 352, 342, 318, 320, 335; 455/418, 422, 455, 445, 466, 552; 709/230, 310

(56) References Cited

U.S. PATENT DOCUMENTS

| 5,175,758 A | | 12/1992 | Levanto et al. | 379/57 |
|---|---|---|---|---|
| 5,323,392 A | * | 6/1994 | Ishii et al. | 370/466 |
| 5,394,391 A | | 2/1995 | Chen et al. | 370/18 |
| 5,629,974 A | * | 5/1997 | Rajala et al. | 455/466 |
| 5,794,156 A | | 8/1998 | Alanara | 455/517 |
| 5,819,174 A | | 10/1998 | Kyllonen | 455/414 |
| 5,903,754 A | * | 5/1999 | Pearson | 709/310 |
| 5,946,634 A | * | 8/1999 | Korpela | 455/552 |
| 5,995,496 A | * | 11/1999 | Honkasalo et al. | 370/318 |
| 6,061,346 A | * | 5/2000 | Nordman | 370/352 |
| 6,094,575 A | * | 7/2000 | Anderson et al. | 455/422 |
| 6,104,928 A | * | 8/2000 | Waugh | 455/445 |
| 6,108,562 A | * | 8/2000 | Rydbeck et al. | 455/552 |
| 6,144,647 A | * | 11/2000 | Lopez-Torres | 370/329 |
| 6,151,484 A | * | 11/2000 | Ramesh | 455/68 |
| 6,185,418 B1 | * | 2/2001 | MacLellan et al. | 455/418 |
| 6,266,342 B1 | * | 7/2001 | Stacey et al. | 370/465 |

FOREIGN PATENT DOCUMENTS

| EP | 0898438 A2 | 2/1999 |
|---|---|---|
| GB | 2292047 A | 2/1996 |
| WO | WO 95/33348 | 12/1995 |
| WO | WO 96/21983 | 7/1996 |
| WO | WO 96/28947 | 9/1996 |
| WO | WO 96/34504 | 10/1996 |
| WO | WO 98/30042 | 7/1998 |

* cited by examiner

Primary Examiner—Huy D. Vu
Assistant Examiner—M. Phan
(74) Attorney, Agent, or Firm—Perman & Green, LLP

(57) ABSTRACT

In order to perform data transmission between a mobile station and a cellular radio network, the cellular radio network comprises a radio access network (104, 105, 106) for processing messages according to a first protocol, and a core network (101, 102, 103) for processing messages according to a second protocol. The mobile station deals with messages according to the first protocol on given lower protocol layers and messages according to the second protocol on a given higher protocol layer. On an adaptation layer (301) located between the higher protocol layer and the lower protocol layers, there is performed an adaptation where the messages according to the first and second protocol are mapped into each other.

9 Claims, 3 Drawing Sheets

ADAPTATION LAYER FOR REALIZING PROTOCOL ADAPTATIONS IN A DIGITAL WIRELESS DATA TRANSMISSION SYSTEM

TECHNOLOGICAL FIELD

In general, the invention relates to performing adaptations between protocols in digital wireless data transmission systems. In particular, the invention relates to performing adaptations in a system where the mobile station may, through a given generally defined radio access network, use the services offered by several different core networks. Here the term wireless means that the mobile stations can be freely movable, and that they have a wireless connection to the base stations of the system.

BACKGROUND OF THE INVENTION

Functions applying digital data transmission protocols are usually described as a stack according to the OSI (Open Systems Interface) model, where the tasks of the various layers of the stack, as well as data transmission between the layers, are exactly defined. In the GSM (Global System for Mobile telecommunications) system, which in this patent application is observed as an example of a digital wireless data transmission system, there are defined five operational layers. The lowest is the transmission layer, and on top of it, there are located in the following order: the RR (Radio Resource management) layer, the MM (Mobility Management) layer, the CM (Communication Management) layer and the OAM (Operation, Administration and Maintenance) layer. The last mentioned OAM layer is not necessarily always located conceptually in the same protocol stack with the rest, because it does not directly increase the value of the service that the user obtains from the other layers. The base station subsystem (BSS) formed by base transceiver stations (BTS) and base station controllers (BSC) operates mainly on the transmission and RR layers, whereas the mobile station (MS) and the mobile services switching centre (MSC) in their operation implement the layers from the transmission layer up to the CM layer. The operation of the home location register (HLR) is concentrated on the MM layer and the CM layer, and the gateway MSC (GMSC) operates on the CM layer only.

Along with the development of digital wireless data transmission systems, there is created a situation where it is advantageous for the mobile station to be able to utilise the services offered by several different core networks (CN). In this new situation, the entity formed by the base station subsystems is called a radio access network (RAN), and the core networks are formed of various central systems which can, in addition to versatile data transmission possibilities, offer various smart network services, such as automatic data transmission, map and location information, banking and purchase services, entertainment, etc. FIG. 1 is a schematical illustration of a suggestion for a third-generation digital cellular radio system, where in between the mobile stations 100 and core networks 101, 102 and 103, there may operate one or several radio access networks 104, 105 and 106. Through a given radio access network, the mobile station 100 can be connected to several core networks, for example like in the drawing, via the radio access network 104 to the core network 101 or 102, and respectively the connection between the mobile station and a given core network can take place through more than one radio access network, for example like in the drawing the connection between the mobile station 100 and the and the core network 102 via the radio access network 104 or 105. The radio access network 104, which is not available to one core network only, is called a generic radio access network (GRAN) or UTRA (UMTS Terrestrial Radio Access; Universal Mobile Telecommunications System).

In a situation according to FIG. 1, problems are connected to data transmission between the different protocol layers. Relations between the protocol layers are illustrated in FIG. 2. The lowest protocol layer between the mobile station MS and the base station subsystem of the generic radio access network UTRA BSS is the layer 1 (L1) 200, 201, which corresponds to a physical radio connection. Above it, there is located an entity corresponding to the layers 2 and 3 or a regular OSI model, wherein the lowest layer is a radio link control/media access control (RLC/MAC) layer 202, 203; on top of it a logical link control (LLC) layer 204, 205; and topmost a radio resource control (RRC) layer 206, 207. Between the base station subsystem UTRA BSS of the generic radio access network and an interworking unit/core network IWU/CN located in the core network, there is assumed to be applied a so-called Iu interface, where the layers corresponding to the above described layers from L1 to LLC are the layers L1 and L2 of the OSI model (blocks 208 and 209 in the drawing), and the layer corresponding to the above described RRC layer is the layer L3 of the OSI model (blocks 210 and 211 in the drawing).

The mobile station MS must include a higher-level control protocol 212 and a protocol 213 for serving higher-level users, of which the former communicates with the RRC layer 206 in order to realise control functions connected to data transmission connections, and the latter communicates directly with the LLC layer 204 in order to transmit such data that directly serves the user (for instance digitally encoded speech). In a mobile station of the GSM system, the blocks 212 and 213 are included in the above mentioned MM layer.

The services offered by core networks may contain remarkable differences. If the mobile station MS must be able to utilise several different core networks, it must contain various higher protocol layers 212 and 213 dependent on the core network applications, according to the core network that it communicates with at each point of time. The core networks are continuously being developed further, wherefore the capabilities and operations of the protocol layers 212 and 213 must be adjustable. On the other hand, there already exist complete second-generation core networks, wherefore it would be advantageous if the mobile station could utilise the services of a second-generation connection irrespective of the fact that the radio access network belongs to the third generation.

SUMMARY OF THE INVENTION

The object of the present invention is to introduce a method and a system whereby the mobile station can utilise the services offered by different core networks through the interworking of a third-generation radio access network.

The objects of the invention are achieved by providing the mobile station with an adaptation layer located on top of the LLC and RRC layers; said adaptation layer has a standardised interface in the downwardly direction, and it performs two-way mapping in between the primitives used by the layers located on top of it, and the primitives of the LLC and RRC layers. Here the term primitive refers to the basic messages between the protocol layers.

The method according to the invention is characterised in that the mobile station deals with messages according to the first protocol on certain lower protocol layers, and with messages according to the second protocol on a certain higher protocol layer, so that on the adaptation layer located in between the higher and the lower protocol layers, there is carried out an adaptation where the messages according to the first and second protocol are mapped to correspond to each other.

The invention also relates to a mobile station characterised in that it comprises, in said protocol stack, lower protocol layers according to a given first protocol, and a higher protocol layer according to a given second protocol, and in between them an adaptation layer for performing such a two-way adaptation where the messages according to the first and second protocol are mapped to correspond to each other.

In between a generic radio access network and a mobile station, the connections are realised as radio bearer services, and one particular mobile station may have several simultaneous radio bearer services. A third-generation system is characterised in that radio bearer services between one mobile station and base transceiver station can be established and released irrespective of each other. Moreover, each radio bearer service has certain typical properties, such as bitrate, quality of service and direction of data transmission. The adaptation layer according to the invention maps the needs of the higher protocol layers and the possibilities offered by the third-generation radio access network in relation to each other according to the following principles:

- Service access points (SAP) are realised in between the adaptation layer and the higher protocol layers; they are not needed in between the adaptation layer and the protocol layers of the radio access network.
- The adaptation layer serves in two directions, mapping the primitives of the higher protocol layers into primitives of the radio access network, and vice versa; thus the protocol layers of the radio access network may receive requests from the higher protocol layers and send them responses and messages.
- The adaptation layer may maintain a list of active radio bearer services between the mobile station and the radio access network.
- The adaptation layer does not have a particular peer entity on the network side, but the respective actions are realised as part of the connection between the radio access network and the core network.
- Owing to the adaptation layer, a third-generation radio access network is transparent from the point of view of the higher protocol layers of the second generation.
- The adaptation layer includes the necessary smart functions in order to start the radio bearer services and processes typical of the radio access network, in correspondence to the needs of the higher protocol layers in question.
- The adaptation layer may receive from the radio access network such additional information which is not directly available for the second-generation higher protocol layers, but which for example prevents the mobile station from requesting a connection that is for capacity reasons not possible in the present cell.
- The adaptation layer may include an interface through which it is possible to select and change the core network protocols supported by the mobile station.

BRIEF DESCRIPTION OF THE DRAWINGS

The invention shall be described in more detail below, with reference to the preferred embodiments presented by way of example, and to the appended drawings, wherein.

In the specification above, in connection with the description of the prior art, FIGS. 1 and 2 were already referred to; in the description of the invention and its preferred embodiments below we shall mainly refer to FIGS. 3–5. Like numbers for like parts are used in the drawings.

DETAILED DESCRIPTION OF THE INVENTION

Figure 1:
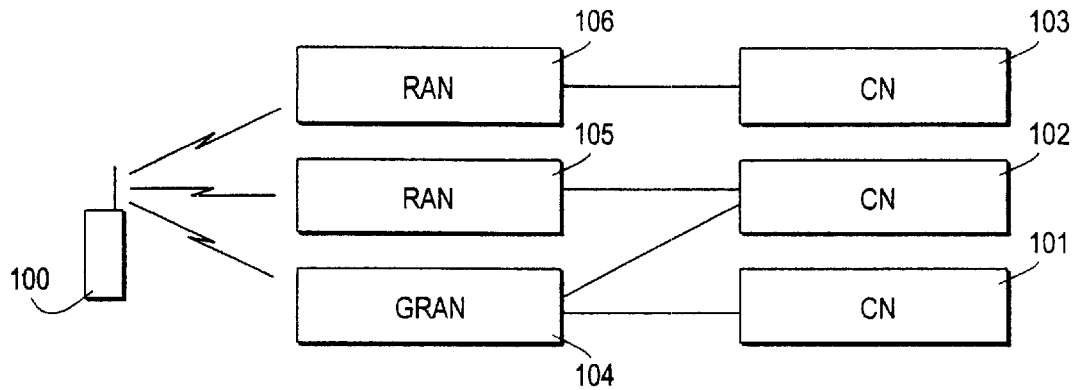
FIG. 1 illustrates the structure of a third-generation cellular radio network.
Figure 2:
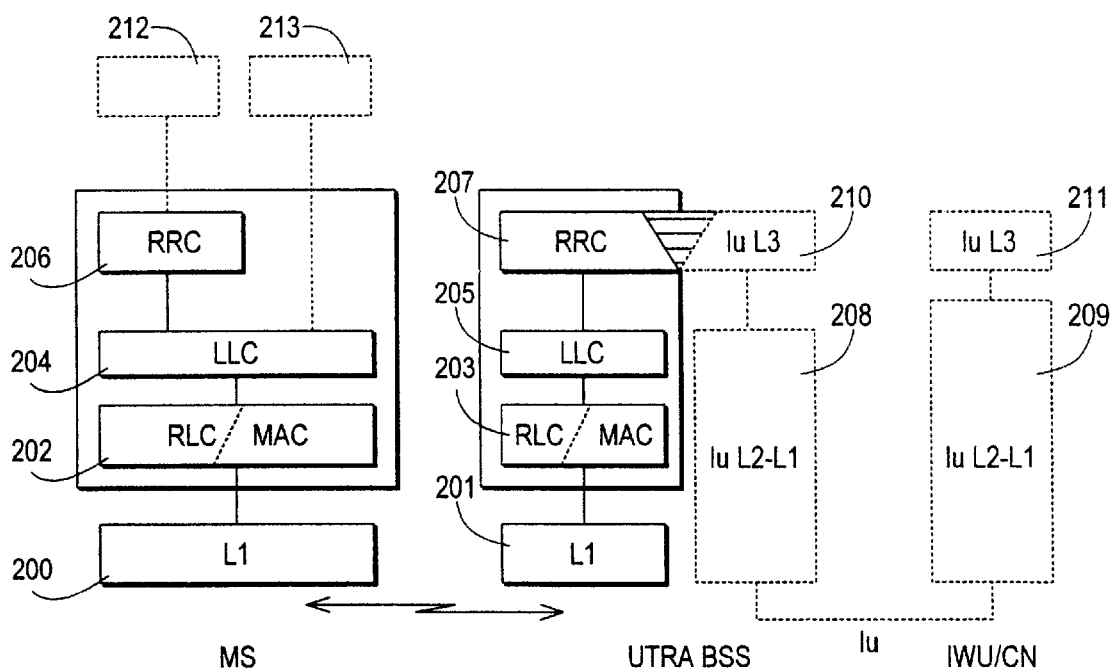
FIG. 2 illustrates the protocol layers in a third-generation radio access network.
Figure 3:
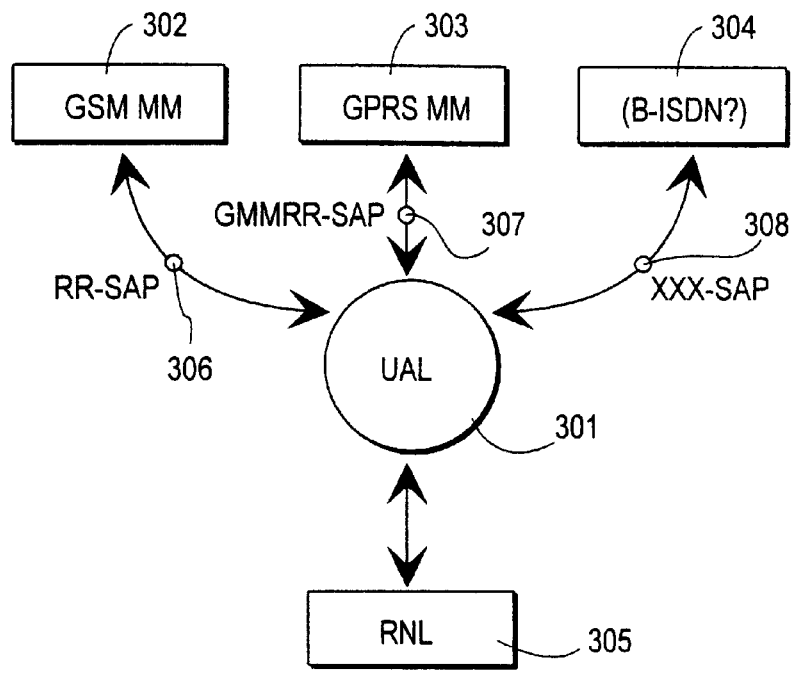
FIG. 3 illustrates how an adaptation layer according to the invention is located with respect to the protocol layers.

FIG. 3 illustrates the mutual relations of certain protocol layers in the mobile station of a preferred embodiment of the invention. The adaptation layer according to the invention is called UAL (UMTS Adaptation Layer; Universal Mobile Telecommunications System), and it is marked with the reference number 301. Above it in the protocol hierarchy, there may be several parallel, mutually optional higher-level protocols. The drawing illustrates a GSM MM protocol layer 302, a GPRS MM protocol layer 303 (General Packet Radio Service; Mobility Management), as well as another protocol layer 304, which may be for instance a B-ISDN (Broadband Integrated Services Digital Network). Underneath the UAL in the protocol hierarchy, there is the RNL layer 305 which maps in general the part of the protocol stack to be applied in the radio access network between the mobile station and the base transceiver station (cf layers 200-202-204-206 in FIG. 2). From the point of view of the higher protocol layers 302, 303 and 304, the UAL 301 is seen as a group of SAP:s (Service Access Points), which include the RR-SAP 306 (Radio Resource management Service Access Point) designed for GSM MM, the GMMRR-SAP 307 (GPRS MM-RR Service Access Point) designed for GPRS MM, and the XXX-SAP 308, designed for another higher-level protocol, where XXX refers to any symbol by which the protocol represented by block 304 is identified. In general, a service access point means an interface that a given protocol entity offers to another entity, and there may be several of these interfaces available, so that the other protocol entity is free to select any of the service access points available.

A special case of the object of the invention is that the mobile station is able to utilise higher protocol layers according to the GSM system, and consequently we shall in the specification below particularly deal with the use of connections according to the GSM system between a mobile station and a radio access network. The description is easily generalised to other systems dependent on second-generation core networks. In the GSM system, the simplest connection between a mobile station and a base transceiver station is a signalling connection which is needed for example in order to perform a location updating procedure initiated by the mobile station. In a third-generation radio access network, the simplest connection between a mobile station and a radio access network is an IRB (Initial Radio Bearer), which is the first radio bearer service that is established between a mobile station and a base transceiver station. When releasing connections, the IRB is the last to be released. The adaptation layer according to the invention maps the GSM signalling connection as IRB in a fashion according to FIG. 4. An RR_EST_REQ message 402 sent by the GSM-MM layer 302 results in that a UAL 301 according to the invention sends to the RNL layer 305 an RBC_Setup_req message 403, which in the RNL is directed to the RBC layer (Radio Bearer Control, not separately illustrated in the drawing). This causes the establishment of an IRB, which is carried out according to the prior art and is illustrated in FIG. 404 by the arrow 404. As a response to the establishment of the IRB, the RNL sends to the UAL an RBC_Setup_cnf messages 405, which the UAL maps to an RR_EST_CNF message 406 understood by the GSM MM layer.

In order to be able to correctly map a message coming from a higher protocol layer (in FIG. 4 the message 402), the UAL must investigate the values of the parameters possibly included in the message. Let us assume that in FIG. 4, there should be performed the updating of the mobile station location. Now the RR_EST_REQ message described by the arrow 402 contains the value of an establishment cause parameter, which means signal updating. The UAL 301 knows that the signal updating takes place in signalling only, so that in the RBC_Setup_req message 403 composed by it, it communicates to the RNL 305 that the request for establishing a bearer service only refers to establishing an IRB. The RBC_Setup_req message 403 may, without any restrictions set by the invention, as such contain several different types of parameters, which may describe for instance the bearer class or access class of the desired bearer service. Among these, the former can be used as a shortcut, if a given bearer service type indicates simultaneously a number of such parameter values which would normally be used for describing the QoS (Quality of Service) of a given bearer service. Among the different access classes, there may be location updating, speech connection initiated by the mobile station, etc.

Figure 4:
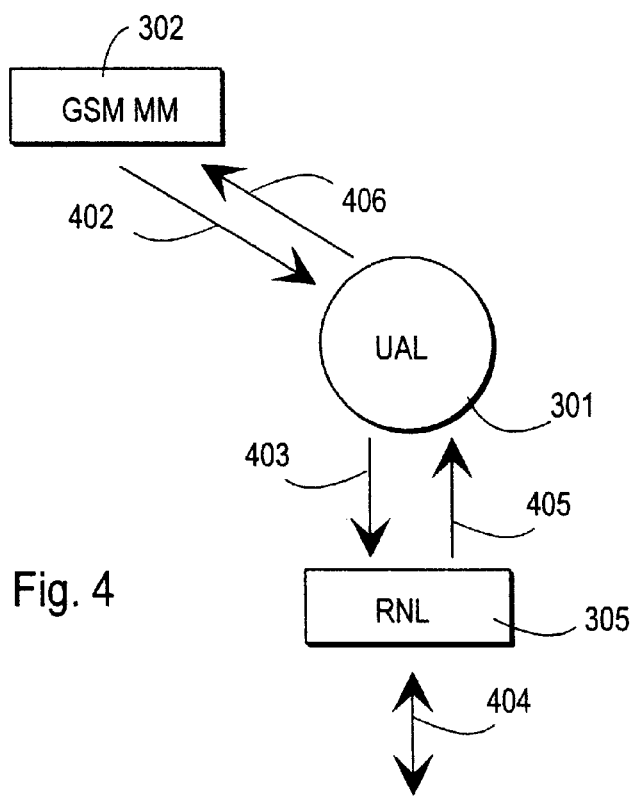
FIG. 4 illustrates how a connection is established according to the method of the invention.

The establishment of an IRB by the initiative of the network, corresponding to the establishment of an IRB by the initiative of the mobile station, illustrated in FIG. 4, is possible for example when the network sends a paging message to the mobile station. Now the establishment of the IRB is carried out by the RNL protocol layers of the radio access network and the mobile station in a known fashion, without a need for the operation of a UAL according to the invention. When the IRB established by the initiative of the network is ready, a message communicating the establishment thereof can be transmitted to the UAL, which identifies the parameter values contained in the message and sends, on the basis thereof, a correct message to a higher protocol layer.

As a special case of the invention, let us observe a situation where the RNL layer located underneath the UAL is the GSM RR layer. If GSM MM is employed above the UAL, adaptations are not required at all, but the UAL operates "transparently", transmitting the messages between the GSM RR and GSM MM layers as such. This transparent operation can be called trivial adaptation, and it can be generally maintained that the UAL always performs an adaptation: either a trivial adaptation or an adaptation proper.

Let us now observe the establishing, by the initiative of the mobile station, of such a bearer service that corresponds to a speech connection. As for their names, the messages between the protocol layers can be called the same as in the establishment of a signalling connection illustrated in FIG. 4. This time, however, the RR_EST_REQ message described by the arrow 402 contains the value of the establishment cause parameter, which refers to a speech connection. The UAL is programmed to identify this value as well as the higher-order protocol from where the message comes, and to include, on the basis of the obtained information, a number of parameters in the RBC_Setup_req message; the values of said parameters the UAL selects so that the bearer service to be established corresponds as accurately as possible to the desired speech connection, as regards the quality of service. If the GSM speech connection desired by the GSM MM layer requires a full-rate TCH (Traffic Channel), where the employed encoding algorithm is the GSM speech algorithm v1, and which has a priority between 1 and 14, the parameters contained in the RBC_Setup_jreq message, describing the bearer service to be established, can be divided into three vectors according to the table below.

| Description of the GSM connection | | Service description of the UTRA bearer service | |
| --- | --- | --- | --- |
| Channel type | | RT-Bearer { | |
| type of data: | speech | traffic vector | |
| Channel type: | Full rate TCH | PBR = | 16 kbit/s |
| Encoding algorithm: | GSM speech algorithm v1 | SBR = | 16 kbit/s or lower |
| Priority: | 1–14 | MBS = | 320 |
| | | QoS vector | |
| | | BER = | 3 |
| | | max_delay = | 30 |
| | | delay_variation = | 0 |
| | | priority = | 1–14 |
| | | security = | ffs |
| | | handover_data_loss = | allowed |
| | | information vector | |
| | | direction = | bi-directional |
| | | type = | core |
| | | configuration = | ptp } |

In this table, there are applied such properties of the UTRA bearer service that have become known from various suggestions related to third-generation digital UMTS cellular radio systems prior to the day of composing the present application.

In the table below, there are described the corresponding messages on one hand between the MM protocol layer and the UAL, and on the other hand between the UAL and the RNL, as well as the parameters connected to said messages.

| Message MM -> UAL | parameters | Message UAL -> RNL | parameters |
| --- | --- | --- | --- |
| RR_Est_req | Primitive Type, Establishment cause, {Service-Request} | RBC_Setup_req | Access Class (IRB), Bearer Cls (IRB), Bearer QoS (TB), Dir (UL,DL,BI), Boolean (IRB/TB), CN Type, SAPI, {Service-Request} |

-continued

| Message MM -> UAL | parameters | Message UAL -> RNL | parameters |
|---|---|---|---|
| RR_Reconfigure_req | Primitive Type, QoS Parameters | RBC_Reconfigure_req | BID, Bearer QoS, {Bearer QoS2}, Dir (UL,DL,BI) |
| RR_Rel_req | Primitive Type | RBC_Release_req | BID, Dir (UL,DL,BI) |
| RR_Data_req | Primitive Type, SAPI, Message Unit | RBC_Data_req | BID, Message Unit |
| RR_Unitdata_req | Primitive Type, SAPI, Message Unit | RBC_Unitdata_req | BID, Message Unit |
| RR_Abort_req | PrimitiveType | RBC_Abort_req | BID, Dir (UL,DL,BI) |
| RR_Activate_req | Primitive Type, Activate Type | RBC_Activate_req | Activate Type |
| RR_Deactivate_req | Primitive Type | RBC_Deactivate_req | — |
| RR_NW_search_start_req | Primitive Type, Search Mode | RRC_NW_search_start_req | Search Mode |
| RR_NW_search_stop_req | Primitive Type | RRC_NW_search_stop_req | — |

In the table below, there are described the corresponding messages on one hand between RNL and UAL, and on the other hand between UAL and the MM protocol layer, as well as the parameters connected to said messages.

| Message RNL -> UAL | parameters | Message UAL -> MM | parameters |
|---|---|---|---|
| RBC_Setup_cnf | BID, AccessClass (IRB), Bearer Cls (IRB), Bearer QoS (TB), Dir (UL,DL,BI), Boolean (IRB/TB), CN Type, SAPI | RR_Est_cnf | Primitive Type, SAPI |
| RBC_Setup_ind | BID, AccessClass (IRB), Bearer Cls (IRB), Bearer QoS (TB), Dir (UL,DL,BI), Boolean (IRB/TB), CN Type, SAPI | RR_Est_ind | Primitive Type, SAPI |
| RBC_Reconfigure_cnf | BID, BearerQoS, {Bearer QoS2}, Dir | RR_Reconfigure_cnf | Primitive Type, QoS Parameters |
| RBC_Reconfigure_ind | BID, BearerQoS, {Bearer QoS2}, Dir | RR_Reconfigure_ind | Primitive Type, QoS Parameters |
| RBC_Release_cnf | BID, Dir (UL,DL,BI) | RR_Rel_cnf | Primitive Type, SAPI, Release Cause |
| RBC_Release_ind | BID, Dir (UL,DL,BI) | RR_Rel_ind | PrimitiveType, SAPI, Release Cause |
| RBC_Data_ind | BID, Message Unit | RR_Data_ind | PrimitiveType, SAPI, Message Unit |
| RBC_Unitdata_ind | BID, Message Unit | RR_Unitdata_ind | Primitive Type, SAPI, Message Unit |
| RBC_Abort_ind | BID, Dir (UL,DL,BI) | RR_Abort_ind | Primitive Type, SAPI |
| RBC_Activate_ind | Activate Type | RR_Activate_ind | Primitive Type, SAPI |
| RBC_ciph_start_ind | Algorithm(s) | RR_Sync_ind | Primitive Type, SAPI, Synchronization Type |
| RRC_NW_search_term_ind | Cell Description | RR_NW_search_term_ind | Primitive Type, Cell Description |

Second-generation digital cellular radio systems have been characterised in that in between the mobile station and the base transceiver station, only one traffic connection at a time has been possible, apart from a possible signalling connection. Third-generation systems aim at a situation where the number of simultaneous connections is not limited in advance. In the upward direction, the UAL protocol layer according to the invention offers several parallel service access points, and the connection from the UAL protocol layer downwards is a third-generation connection. Irrespective of whether there are other active connections, it is thus possible, through the UAL protocol layer, to establish new connections and to release old ones.

By means of the invention, it is easy to realise a multi-mode mobile station which is capable for utilising the services offered by several different core networks, even if there was only one (third-generation) radio access network available. This type of a mobile station is provided with means for an independent operation of several higher-order protocol layers. Each of said higher-order protocol layers can deal with the UAL protocol layer through a given service access point, irrespective of other protocols. Because the UAL is capable of communicating through a given service access point with a given higher protocol layer exactly in the same fashion as a prior art (second-generation) protocol layer that operates underneath said higher protocol layer, the higher protocol layer does not have to know whether it deals with a prior art lower protocol layer or with a UAL according to the invention. This means that a known computer program designed for higher-order protocol layer functions can be copied as such to a mobile station applying the present invention. Obviously the invention does not restrict the protocol layers located above the UAL to only second-generation protocols, but above the UAL, there can be realised any protocol provided that in between the primitives of said protocol and the primitives of the RNL protocol layer of a third-generation radio access network there can be composed unequivocal mappings.

The UAL can be made dynamically configured, i.e. adaptable by way of programming; in that case, if in the mobile station there is loaded some new higher-order protocol, the UAL already contained in the mobile station can be adapted, so that it likewise offers for the new higher-order protocol at least one service access point, or possibly several parallel service access points.

Figure 5:
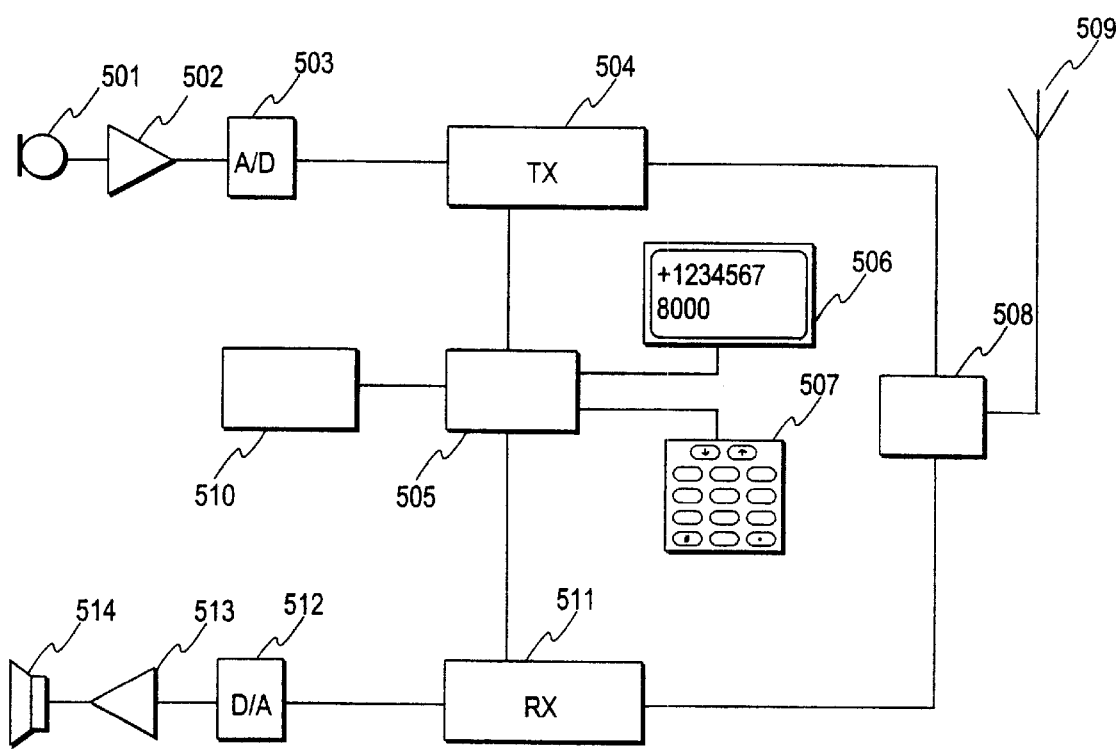
FIG. 5 illustrates a cellular radio system mobile station according to the invention.

FIG. 5 illustrates a block diagram of a mobile station where the UAL according to the invention can be employed. A microphone 501, an amplifier 502, an A/D converter 503 and a transmitter 504 constitute a transmission branch, which can as such conform to the prior art, like the reception branch composed of a receiver 511, a D/A converter 512, an amplifier 513 and a loudspeaker 514, as well as the duplexing block 508 which controls the signal between these two and an antenna 509. Most advantageously the control block 505 is realised by using a microprocessor with connections to a display 506 and a keyboard 507, as well as to a memory 510, whereto there is recorded the program performed by the microprocessor 505, and which is used as a data storage location during operations.

The adaptation layer according to the invention is most advantageously realised as part of a program recorded in the memory 510.

What is claimed is:

1. A method for realising data transmission between a mobile station (100) and a digital wireless data transmission system, said digital wireless data transmission system comprising a radio access network (104, 105, 106) processing messages according to a first protocol, and a core network (101, 102, 103) processing messages according to a second protocol said method comprising the steps of handling messages according to the first protocol in the mobile station according to a certain set of lower protocol layers (305), handling messages according to the second protocol in the mobile station according to a certain higher protocol layer (302, 303, 304), carrying out an adaptation by providing a separate protocol adaptation layer (301) between said higher protocol layer and said lower protocol layers, wherein said messages according to the first and second protocols are mapped into each other; and wherein said adaptation layer is arranged to emulate the operation of a certain previously defined set of lower protocol layers towards a certain previously defined higher protocol layer and to emulate the operation of a certain previously defined higher protocol layer towards a certain previously defined set of lower protocol layers.

2. A method according to claim 1, wherein the first protocol is a data transmission protocol of a third-generation digital cellular radio system, and the second protocol is a data transmission protocol of a second-generation digital cellular radio system.

3. A method according to claim 2, wherein the first protocol comprises, in between the mobile station and the radio access network base station subsystem, an L1 layer (200), which corresponds to a physical radio connection, and above it an RLC/MAC layer (202), an LLC layer (204) and an RRC layer (206), corresponding to the layers 2 and 3 of the OSI model, and that the second protocol is a data transmission protocol of the GSM system, comprising a GSM MM layer (302).

4. A method according to claim 2, wherein the first protocol comprises in between the mobile station and the radio access network base station subsystem, an L1 layer (200), which corresponds to a physical radio connection, and above it an RLC/MAC layer (202), an LLC layer (204) and an RRC layer (206), corresponding to the layers 2 and 3 of the OSI model, and that the second protocol is a data transmission protocol of the GPRS system, comprising a GPRS MM layer (303).

5. A method according to claim 1, wherein the first protocol is a data transmission protocol of a third-generation digital cellular radio system, and the second protocol is a data transmission protocol of a core network of a third-generation digital cellular radio system.

6. A method according to claim 1, additionally comprising the step of offering at said adaptation layer (301) to the protocol layers located above it at least two parallel service access points (306, 307, 308) in order to adapt at least two mutually optional second protocols with the first protocol.

7. A cellular radio system mobile station, comprising means for implementing data transmission with a radio access network according to a given protocol stack, and in said protocol stack, a certain set of lower protocol layers according to a given first protocol and a higher protocol layer according to a given second protocol, and in between these, an adaptation layer for carrying out such a two-way adaptation where the messages according to the first and second protocols are mapped into each other, wherein said adaptation layer is arranged to emulate the operation of a certain previously defined set of lower protocol layers towards a certain previously defined higher protocol layer and to emulate the operation of a certain previously defined higher protocol layer towards a certain previously defined set of lower protocol layers.

8. A mobile station according to claim 7, comprising a certain first higher protocol layer and as a parallel alternative to it a second higher protocol layer, wherein said adaptation layer is arranged to identify from which higher protocol layer a given message has been received.

9. A mobile station according to claim 8, wherein said first higher protocol layer is a GSM MM layer and said second higher protocol layer is a GPRS MM layer.

* * * * *